US012798557B2

(12) United States Patent
Isele

(10) Patent No.: US 12,798,557 B2
(45) Date of Patent: Nov. 17, 2026

(54) METHOD FOR AUTOMATED PARKING OF A MOTOR VEHICLE IN A PARKING LOT

(71) Applicant: Dr. Ing. h.c. F. Porsche Aktiengesellschaft, Stuttgart (DE)

(72) Inventor: Simon Isele, Leinfelden (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 16 days.

(21) Appl. No.: 18/918,129

(22) Filed: Oct. 17, 2024

(65) Prior Publication Data

US 2025/0136093 A1 May 1, 2025

(30) Foreign Application Priority Data

Oct. 25, 2023 (DE) ..................... 10 2023 129 440.7

(51) Int. Cl.
*B60W 30/06* (2006.01)
*B60W 60/00* (2020.01)
*G08G 1/14* (2006.01)

(52) U.S. Cl.
CPC ........ *B60W 30/06* (2013.01); *B60W 60/0025* (2020.02); *G08G 1/141* (2013.01)

(58) Field of Classification Search
None
See application file for complete search history.

(56) References Cited

U.S. PATENT DOCUMENTS

2016/0362103 A1* 12/2016 Büschenfeld .......... G08G 1/005
2018/0328750 A1 11/2018 Yun et al.
2019/0193725 A1* 6/2019 Suzuki ................. G05D 1/0011
2020/0062243 A1* 2/2020 Perez Barrera .... B62D 15/0285
2020/0180607 A1* 6/2020 Choi ...................... G08G 1/164
2020/0346638 A1* 11/2020 Benmimoun ...... B62D 15/0285
2021/0009110 A1* 1/2021 Jeong .................. G06V 20/584
(Continued)

FOREIGN PATENT DOCUMENTS

CN 111833645 A * 10/2020 ............ G08G 1/146
DE 102016212629 A1 * 1/2018 ............ B60W 50/14
(Continued)

OTHER PUBLICATIONS

DE-102016212629-A1 English translation, retrieved from Espacenet on Dec. 23, 2025 (Year: 2025).*

*Primary Examiner* — Amelia Vorce
(74) *Attorney, Agent, or Firm* — LEYDIG, VOIT & MAYER, LTD.

(57) ABSTRACT

A method for automated parking of a motor vehicle in a parking lot includes retrieving a reference parking lot trajectory assigned to the parking lot from a trajectory memory, moving the motor vehicle automatically along the reference parking lot trajectory, and recording environment sensor data during the automated movement along the reference parking lot trajectory. The method further includes carrying out a parking space detection based on the environment sensor data, moving the motor vehicle automatically to the unoccupied parking space when an unoccupied parking space is detected, and moving the motor vehicle along the reference parking lot trajectory until an unoccupied parking space is detected. The reference parking lot trajectory is a closed ring trajectory.

11 Claims, 3 Drawing Sheets

(56) References Cited

U.S. PATENT DOCUMENTS

| | | | | |
|---|---|---|---|---|
| 2022/0299329 A1* | 9/2022 | Benmimoun | ........ | G05D 1/0221 |
| 2023/0136079 A1* | 5/2023 | Yamaura | ............ | B62D 15/0285 340/932.2 |

FOREIGN PATENT DOCUMENTS

| | | | | | |
|---|---|---|---|---|---|
| DE | 102019122397 A1 * | 2/2020 | ......... | B62D 15/0285 |
| JP | 2020090281 A * | 6/2020 | .......... | B60W 60/001 |

* cited by examiner

METHOD FOR AUTOMATED PARKING OF A MOTOR VEHICLE IN A PARKING LOT

CROSS REFERENCE TO RELATED APPLICATIONS

This application claims benefit to German Patent Application No. DE 10 2023 129 440.7, filed on Oct. 25, 2023, which is hereby incorporated by reference herein.

FIELD

The present invention relates to a method for the automated parking of a motor vehicle in a parking lot.

BACKGROUND

A method for automated parking is known from US 2018/0328750 A1.

SUMMARY

In an embodiment, the present disclosure provides a method for automated parking of a motor vehicle in a parking lot, comprising retrieving a reference parking lot trajectory assigned to the parking lot from a trajectory memory, moving the motor vehicle automatically along the reference parking lot trajectory, and recording environment sensor data during the automated movement along the reference parking lot trajectory. The method further comprises carrying out a parking space detection based on the environment sensor data, moving the motor vehicle automatically to the unoccupied parking space when an unoccupied parking space is detected, and moving the motor vehicle along the reference parking lot trajectory until an unoccupied parking space is detected. The reference parking lot trajectory is a closed ring trajectory.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
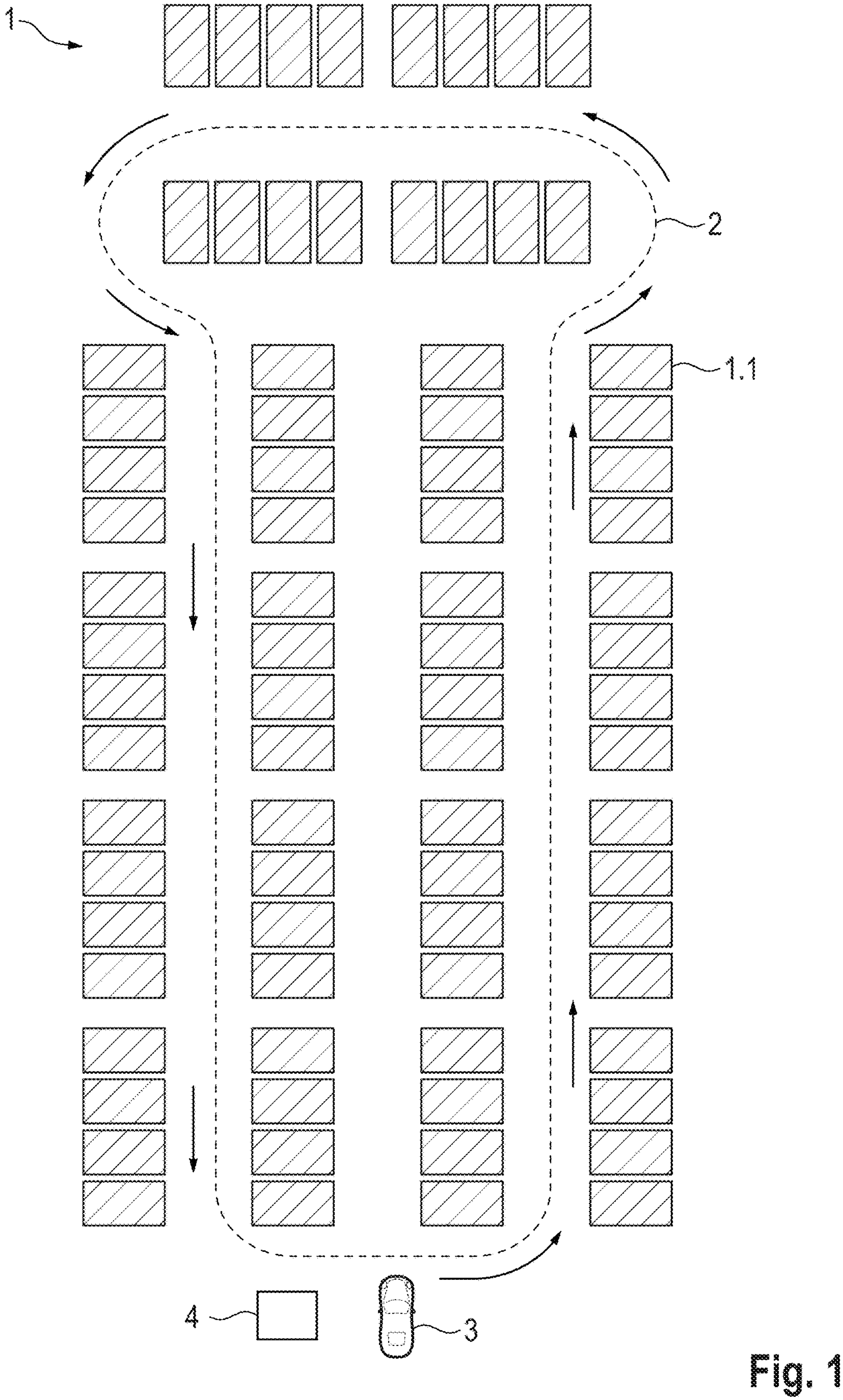
FIG. 1 schematically illustrates a parking lot and a reference parking lot trajectory according to an embodiment of the invention assigned to the parking lot, along which a motor vehicle that is automatically moved during the execution of a method according to an embodiment the invention, at a time when all parking spaces are occupied.

In an embodiment, present invention enables reliable automated parking in a relatively busy parking lot.

In a method according to an embodiment of the invention for the automated parking of a motor vehicle in a parking lot, the parking lot is identified, preferably based on position data of the motor vehicle, and a reference parking lot trajectory assigned to the parking lot is retrieved from a trajectory memory of the motor vehicle. The reference parking lot trajectory stored in the trajectory memory can, for example, have been received from a computer system external to the vehicle or can have been learned by driving into the parking lot during a previous visit to the parking lot. Preferably, the reference parking lot trajectory leads past all parking spaces in the parking lot.

In the method according to the present disclosure for automated parking of a motor vehicle in a parking lot, a check is also made, based on position data of the motor vehicle, as to whether the motor vehicle is located at the retrieved reference parking lot trajectory and, if the motor vehicle is located at the reference parking lot trajectory, the motor vehicle is automatically moved along the reference parking lot trajectory in a known manner. Preferably, a driver of the motor vehicle leaves the motor vehicle before the automated movement along the reference parking lot trajectory is started and monitors the automated parking process remotely via a mobile device coupled to the motor vehicle, for example via a smartphone coupled to the motor vehicle.

In the method according to the present disclosure for the automated parking of a motor vehicle in a parking lot, during the automated movement along the reference parking lot trajectory, environment sensor data is recorded essentially continuously in a known manner by means of a vehicle sensor system and a parking space detection is carried out based on the environment sensor data in order to detect the presence or absence of an unoccupied parking space in the vicinity of the motor vehicle. The environment sensor data can include radar data, LiDAR data, ultrasonic data or image data from a camera, for example. Based on the camera's image data, line markings and parking lot identification numbers can be recorded, for example. Preferably, the dimensions of the respective motor vehicle are also taken into account during parking space detection, so that only unoccupied parking spaces suitable for a parking process with the respective motor vehicle are actually recognized as unoccupied parking spaces.

In the method according to the present disclosure for the automated parking of a motor vehicle in a parking lot, when an unoccupied parking space is detected in the vicinity of the motor vehicle, a parking process is initiated in the detected unoccupied parking space and the motor vehicle is automatically moved to the detected unoccupied parking space in a known manner.

According to the present disclosure, the reference parking lot trajectory is a closed ring trajectory and the motor vehicle is moved "in a circle" along the reference parking lot trajectory until an unoccupied parking space is detected. The vehicle is therefore moved—beyond the starting point of the automated movement—"in a circle" along the reference parking lot trajectory, which is designed as a closed ring trajectory, until an unoccupied parking space is detected. This enables reliable automated parking even in a relatively busy parking lot.

Preferably, the reference parking lot trajectory is provided by a computer system external to the vehicle, so that a method according to the present disclosure can also be carried out in a parking lot that has not yet been visited. The reference parking lot trajectory can, for example, be provided by a computer system of the parking lot via a local data connection when entering the parking lot. However, it is also provided that the reference parking lot trajectory is provided by a cloud computer system via the Internet.

Preferably, the motor vehicle is automatically moved to a transfer position located at the reference parking lot trajectory after receiving a parking command, so that the driver of the motor vehicle does not have to move to the motor vehicle. For example, the parking command can be transmitted to the vehicle via a mobile device coupled to the vehicle. It is also provided that the parking command is transmitted to the vehicle via a radio key.

Advantageously, the transfer position can be any position on the reference parking lot trajectory, wherein the transfer position is determined by a driver of the motor vehicle. The transfer position can, for example, be determined by the driver when/before leaving the vehicle, for example as a starting position for automated movement along the reference parking lot trajectory. However, it is also provided that the transfer position can be determined subsequently, i.e. after leaving the vehicle, for example via a mobile device coupled to the vehicle.

In a preferred embodiment, the transfer position is received together with the parking command. The transfer position can, for example, correspond to the current position of a mobile device sending the parking command.

Preferably, for both possible directions of rotation along the reference parking lot trajectory, i.e. both for a clockwise movement and for a counterclockwise movement, a travel distance is determined in each case starting from the parking position along the reference parking lot trajectory up to the transfer position, and the motor vehicle is automatically moved in the one of the two possible directions of rotation whose travel distance is shorter in order to move the motor vehicle as quickly and efficiently as possible to the transfer position.

An exemplary embodiment of the present disclosure is described below with reference to the attached figures.

Figure 2:
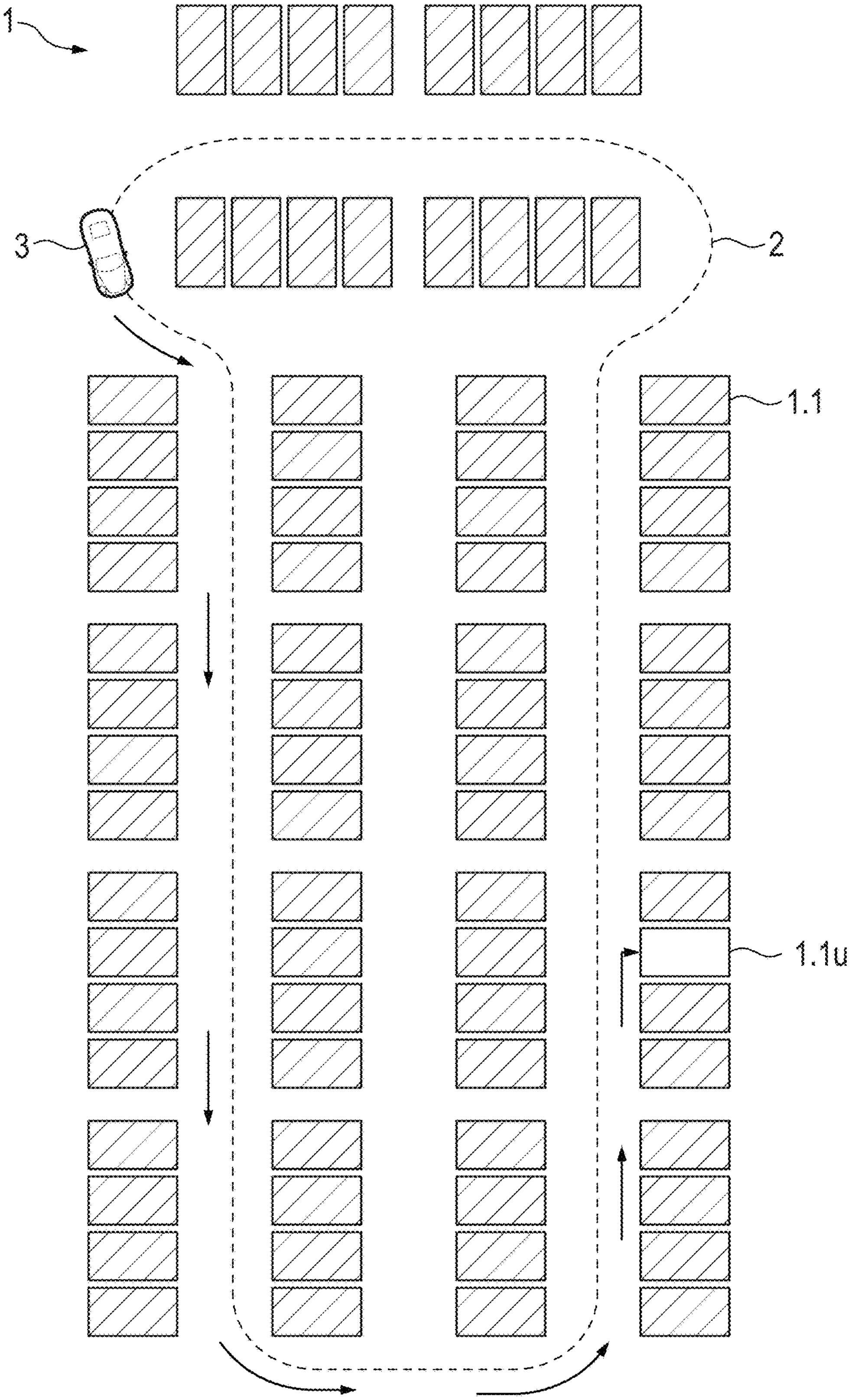
FIG. 2 illustrates the parking lot from FIG. 1 at a time when an unoccupied parking space is available.

The figures show a parking lot 1 with a plurality of parking spaces 1.1, wherein in FIG. 1 all parking spaces 1.1 of the parking lot 1 are occupied and in FIG. 2 there is an unoccupied parking space 1.1*u*.

The figures also show a reference parking lot trajectory 2 assigned to the parking lot 1, which according to the present disclosure is designed as a closed ring trajectory and leads past all parking spaces 1.1 of the parking lot 1.

The figures also show a motor vehicle 3 that is to be parked automatically in the parking lot 1 using a method according to the present disclosure.

When entering the parking lot 1, the reference parking lot trajectory 2 is provided to the motor vehicle 3 by a computer system 4 external to the vehicle via a local data connection and stored in a trajectory memory of the motor vehicle 3.

According to the present disclosure, the motor vehicle 3 is moved by its driver to any position on the reference parking lot trajectory 2, as shown by way of example in FIG. 1.

There, the driver leaves the motor vehicle 3 and sends a parking command to the motor vehicle 3 via a smartphone coupled to the motor vehicle 3.

In response to the parking command, a parking system of the motor vehicle 3 retrieves the reference parking lot trajectory 2 from the trajectory memory and the motor vehicle 3 is automatically moved along the reference parking lot trajectory 2 by the parking system—as illustrated by the arrows in the figures.

During the automated movement along the reference parking lot trajectory 2, the parking system continuously records environment sensor data by means of a vehicle sensor system of the motor vehicle 3 and carries out a parking space detection based on the environment sensor data in order to determine whether or not an unoccupied parking space 1.1*u* is present in the vicinity of the motor vehicle 3.

According to the present disclosure, the motor vehicle 3 is automatically moved along the reference parking lot trajectory 2 by the parking system until an unoccupied parking space 1.1*u* is detected in the vicinity of the motor vehicle 3.

If, for example, all parking spaces 1.1 of the parking lot 1 are occupied, as shown in FIG. 1, the parking system moves the vehicle 3 in a circle along the reference parking lot trajectory 2 until one of the parking spaces 1.1 becomes free, as shown in FIG. 2, and consequently an unoccupied parking space 1.1*u* is available.

Figure 3:
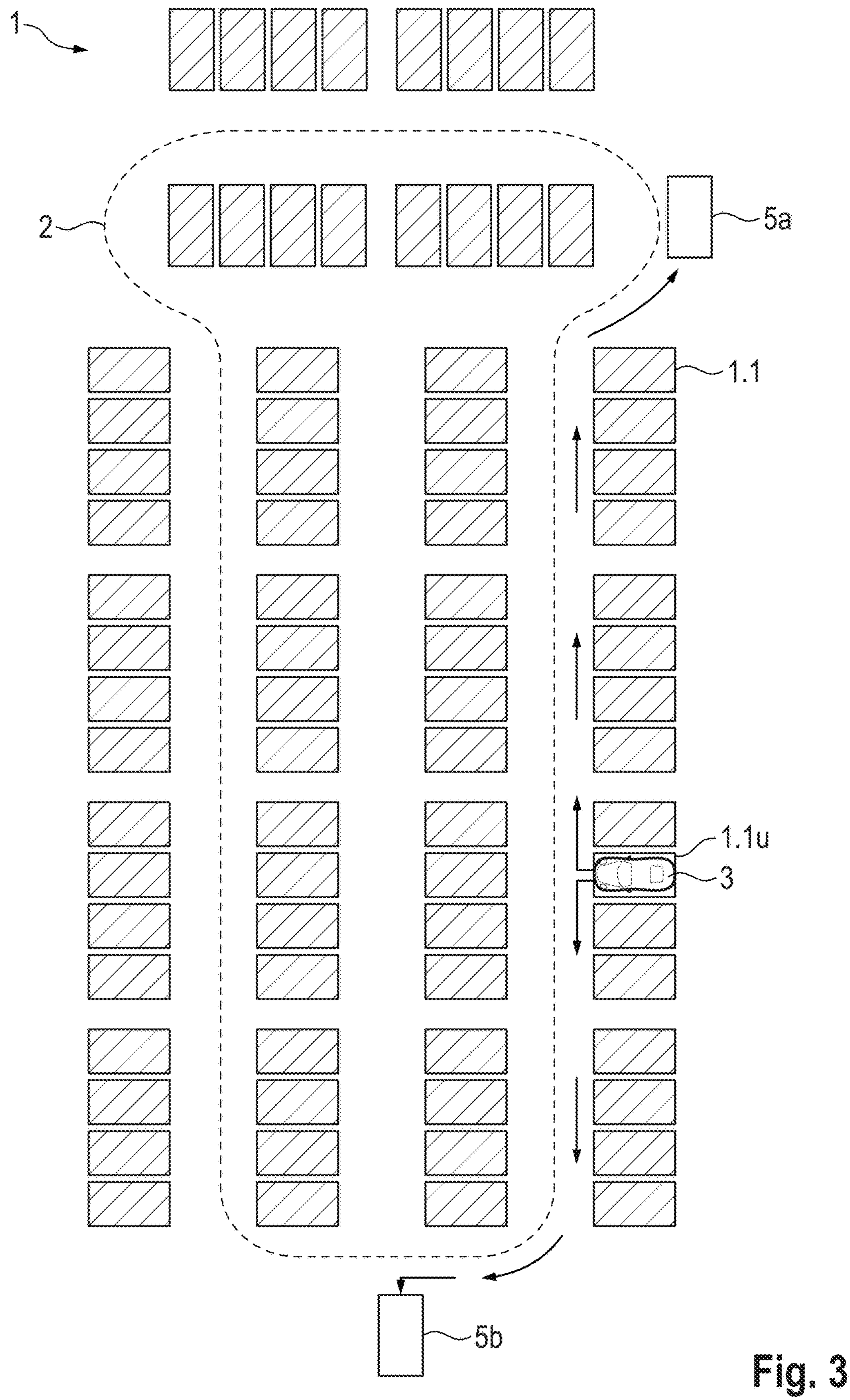
FIG. 3 illustrates the parking lot from FIG. 1 and FIG. 2 at a time when the vehicle is in the unoccupied parking space in FIG. 2 and receives a parking command.

If the unoccupied parking space 1.1*u* is detected by the parking system when moving along the reference parking lot trajectory 2, a parking process is initiated by the parking system and the motor vehicle 3 is moved automatically by the parking system—as illustrated by the arrows in FIG. 2 and shown in FIG. 3—to the unoccupied parking space 1.1*u*.

At any time, the driver of the motor vehicle 3 transmits a parking command to the motor vehicle 3, wherein together with the parking command, a transfer position 5*a* located at the reference parking lot trajectory 2 is also transmitted to the motor vehicle 3 and thereby determined.

Alternatively, it is also provided that a start position 5*b* located on the reference parking lot trajectory 2 is defined as the transfer position by the driver before/as he leaves the vehicle 3.

In response to the parking command, the parking system determines a travel distance to the transfer position 5*a* or 5*b* along the reference parking lot trajectory 2 for each of the two possible directions of rotation and then automatically moves the motor vehicle 3 in the one of the two possible directions of rotation along the reference parking lot trajectory 2 to the transfer position 5*a* or 5*b* whose travel distance is shorter.

Starting from the parking position shown in FIG. 3, the parking system would consequently move the motor vehicle—as illustrated by the arrows in FIG. 3—to the transfer position 5*a* counterclockwise along the reference parking lot trajectory 2 and to the transfer position 5*b* clockwise along the reference parking lot trajectory 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Parking lot
1.1 Parking spaces
1.1*u* Unoccupied parking space
2 Reference parking lot trajectory
3 Motor vehicle
4 Computer system external to the vehicle
5*a*, 5*b* Transfer positions

The invention claimed is:

1. A method for automated parking of a motor vehicle in a parking lot, comprising:

retrieving a reference parking lot trajectory assigned to the parking lot from a trajectory memory, wherein the reference parking lot trajectory is a closed ring trajectory;

receiving a driver transfer position located along the reference parking lot trajectory;

moving the motor vehicle automatically along the reference parking lot trajectory comprising the driver transfer position;

recording environment sensor data using a vehicle sensor system during the automated movement along the reference parking lot trajectory, and carrying out a parking space detection based on the environment sensor data;

moving the motor vehicle along the reference parking lot trajectory until an unoccupied parking space is detected; and moving the motor vehicle automatically to the unoccupied parking space when the unoccupied parking space is detected.

2. The method according to claim 1, wherein the reference parking lot trajectory is provided by a computer system external to the vehicle.

3. The method according to claim 1, comprising automatically moving the motor vehicle to the driver transfer position located at the reference parking lot trajectory after receiving a parking command.

4. The method according to claim 3, wherein the driver transfer position is determined by a driver of the motor vehicle.

5. The method according to claim 4, wherein the driver transfer position is received together with the parking command.

6. The method according to claim 3, comprising determining a respective travel distance to the driver transfer position for two possible directions of rotation along the reference parking lot trajectory and automatically moving the motor vehicle in one of the two directions of rotation in which travel distance is shorter.

7. The method according to claim 3, wherein the environment sensor data is recorded, using the vehicle sensor system, after a driver of the motor vehicle exits the motor vehicle at the driver transfer position.

8. The method according to claim 3, further comprising:

receiving, by a driver located separately from the motor vehicle, the parking command and a location of the driver transfer position.

9. The method according to claim 1, wherein moving the motor vehicle along the reference parking lot trajectory until the unoccupied parking space is detected further comprises:

moving the motor vehicle continuously in a same direction of rotation along the reference parking lot trajectory such that the motor vehicle passes a same occupied parking space more than once.

10. The method according to claim 1, wherein the motor vehicle begins moving along the closed loop trajectory of the reference parking lot trajectory at the driver transfer position.

11. The method according to claim 1, wherein carrying out the parking space detection further comprises:

detecting markings defining the unoccupied parking space; and determining, based on the dimensions of the motor vehicle and the markings defining the parking space, that the unoccupied parking space is dimensioned to receive the motor vehicle.

* * * * *